(12) United States Patent
LeJeune, Jr.

(10) Patent No.: US 10,475,326 B2
(45) Date of Patent: *Nov. 12, 2019

(54) SYSTEM AND METHOD FOR TRACKING INTERACTION BETWEEN MONITORED POPULATION AND UNMONITORED POPULATION

(71) Applicant: SATELLITE TRACKING OF PEOPLE LLC, Houston, TX (US)

(72) Inventor: David W. LeJeune, Jr., Conroe, TX (US)

(73) Assignee: SATELLITE TRACKING OF PEOPLE LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/004,959

(22) Filed: Jun. 11, 2018

(65) Prior Publication Data

US 2018/0293870 A1  Oct. 11, 2018

Related U.S. Application Data

(63) Continuation of application No. 15/464,749, filed on Mar. 21, 2017, now Pat. No. 10,019,887.

(51) Int. Cl.
| | |
|---|---|
| *G08B 21/22* | (2006.01) |
| *H04W 88/08* | (2009.01) |
| *H04W 4/029* | (2018.01) |
| *H04W 4/80* | (2018.01) |
| *H04W 60/00* | (2009.01) |

(52) U.S. Cl.
CPC .............. *G08B 21/22* (2013.01); *H04W 4/80* (2018.02); *H04W 60/00* (2013.01); *H04W 4/029* (2018.02); *H04W 88/08* (2013.01)

(58) Field of Classification Search
CPC ....................................................... G08B 21/22
USPC ..................................................... 340/539.13
See application file for complete search history.

(56) References Cited

U.S. PATENT DOCUMENTS

| | | | |
|---|---|---|---|
| 7,982,609 B2 * | 7/2011 | Padmanabhan .......... | H04Q 9/00 235/385 |
| 2002/0024443 A1 * | 2/2002 | Hawkins ................ | G08B 21/22 340/573.1 |
| 2010/0090826 A1 * | 4/2010 | Moran ............... | G08B 13/1427 340/539.13 |

(Continued)

*Primary Examiner* — Santiago Garcia
(74) *Attorney, Agent, or Firm* — Polsinelli PC

(57) ABSTRACT

A method and system for detecting interaction between monitored individuals and unmonitored individuals is provided. The method includes at each monitored individual: identifying a short range wireless access point that is proximate to the monitored individual; first determining the location of the monitored individual when the identified short range wireless access point was detected; and uploading, from the monitored individual to a central monitoring location, data corresponding to the identified short range wireless access point and the location of the monitored individual when the short range wireless access point was detected. The method include at the central monitoring location: second determining whether: (a) the identified short range wireless access point is a mobile wireless access point; and (b) two or more of the monitored individuals encountered the identified short range wireless access point.

22 Claims, 18 Drawing Sheets

(56) References Cited

U.S. PATENT DOCUMENTS

| | | | |
|---|---|---|---|
| 2013/0137076 A1* | 5/2013 | Perez | G09B 5/06 434/308 |
| 2014/0002575 A1* | 1/2014 | Fennell | H04N 7/141 348/14.02 |
| 2014/0118144 A1* | 5/2014 | Amis | G08B 21/02 340/540 |
| 2015/0365448 A1* | 12/2015 | Stifelman | H04L 65/403 709/204 |
| 2016/0198010 A1* | 7/2016 | Roy | H04L 67/22 709/224 |
| 2017/0150306 A1* | 5/2017 | Lejeune, Jr. | H04W 4/021 |

* cited by examiner

SYSTEM AND METHOD FOR TRACKING INTERACTION BETWEEN MONITORED POPULATION AND UNMONITORED POPULATION

CROSS REFERENCE TO RELATED APPLICATIONS

This application is a continuation filing and claims priority to U.S. patent application Ser. No. 15/464,749, entitled SYSTEM AND METHOD FOR TRACKING INTERACTION BETWEEN MONITORED POPULATION AND UNMONITORED POPULATION, filed on Mar. 21, 2017, now allowed. The entire content of the application is hereby incorporated by reference in its entirety.

FIELD OF THE INVENTION

The various embodiments described herein relate generally to monitoring interactions between members of a monitored population with non-monitored individuals. More particularly, various embodiments herein relate to determining whether monitored individuals are interacting through an unmonitored intermediary.

BACKGROUND

The monitoring of movements of monitored individuals involves a variety of sectors, including parolees and home confinement. The technology has its roots in the home arrest systems of the 1980's, in which a user wearable component—typically a "beacon" anklet that was locked to the monitored individual—would communicate wirelessly with a stationary base unit. The range was limited to a few feet of the radio frequency transmitter and receiver. The base unit included a telephone connection for communicating with the authorities. If the monitored individual left the short range allowed by the equipment, the tag and the base unit would lose contact and the base unit would respond by sending an alert to the authorities. False alarms for minor deviations from the short range and/or an inability to confirm false from actual alarms (if the person was where they were supposed to be when the police arrived to investigate) desensitized the police to such alerts, rendering the technology of limited application to low risk offenders.

A later generation of the technology incorporated GPS and cellular telephone technology in a locked anklet. The device would actively record the location of the monitored individual over time and transmit the data to a central monitoring location (e.g., police or parole monitoring services). The central location could store and analyze the data for prohibited movements (e.g., a sex offender near a school) or cross reference the movement data with crime data to see if the monitored individual was near the crime at the time of the crime. U.S. Pat. Nos. 5,867,103, 6,160,481, 6,218,945, 6,512,456 and 6,703,936, incorporated herein by reference in their entireties, are each exemplary of such a system. The technology is also used to monitor other individual sectors (e.g., patients, children) and objects (e.g., cars, cargo).

The modern monitoring device includes a GPS receiver that determines location, a memory that stores location data over time to define a movement history, and a cellular modem that communicates the movement history to a central location through the cell network. A common implementation is in the criminal justice system as an alternative to incarceration, and monitored individuals (typically parolees) have tamper resistant devices attached to their leg. For ease of discussion embodiments herein are directed to parolees, although the invention is not so limited.

Often monitored individuals are prohibited from interacting with each other. For example, in some jurisdictions parolees are not allowed to congregate, even socially, outside of approved environments (e.g., parole office, halfway house). Physical interactions between monitored individuals can be identified by overlap in the their movements as reported by their monitoring devices, as the movement data from the monitoring devices would show that monitored individuals were at the same place at the same time. Such interactions can be flagged for reporting to supervising authorities in near real time.

A limitation on the above tracking technology is that it cannot identify or track interactions between monitored individuals and unmonitored individuals. Thus for example, monitored individual A could meet with an unmonitored individual in the morning, and then the unmonitored individual could meet with monitored individual B later in the day. The unmonitored individual could thus act as a go-between to relay items, information or communication between monitored individuals A and B. This interaction will not be identified by the movement data, as the monitored individuals A and B were never in physical proximity with each other at the same time.

BRIEF DESCRIPTION OF THE DRAWINGS

Various embodiments in accordance with the present disclosure will be described with reference to the drawings, in which.

DETAILED DESCRIPTION

Figure 1:
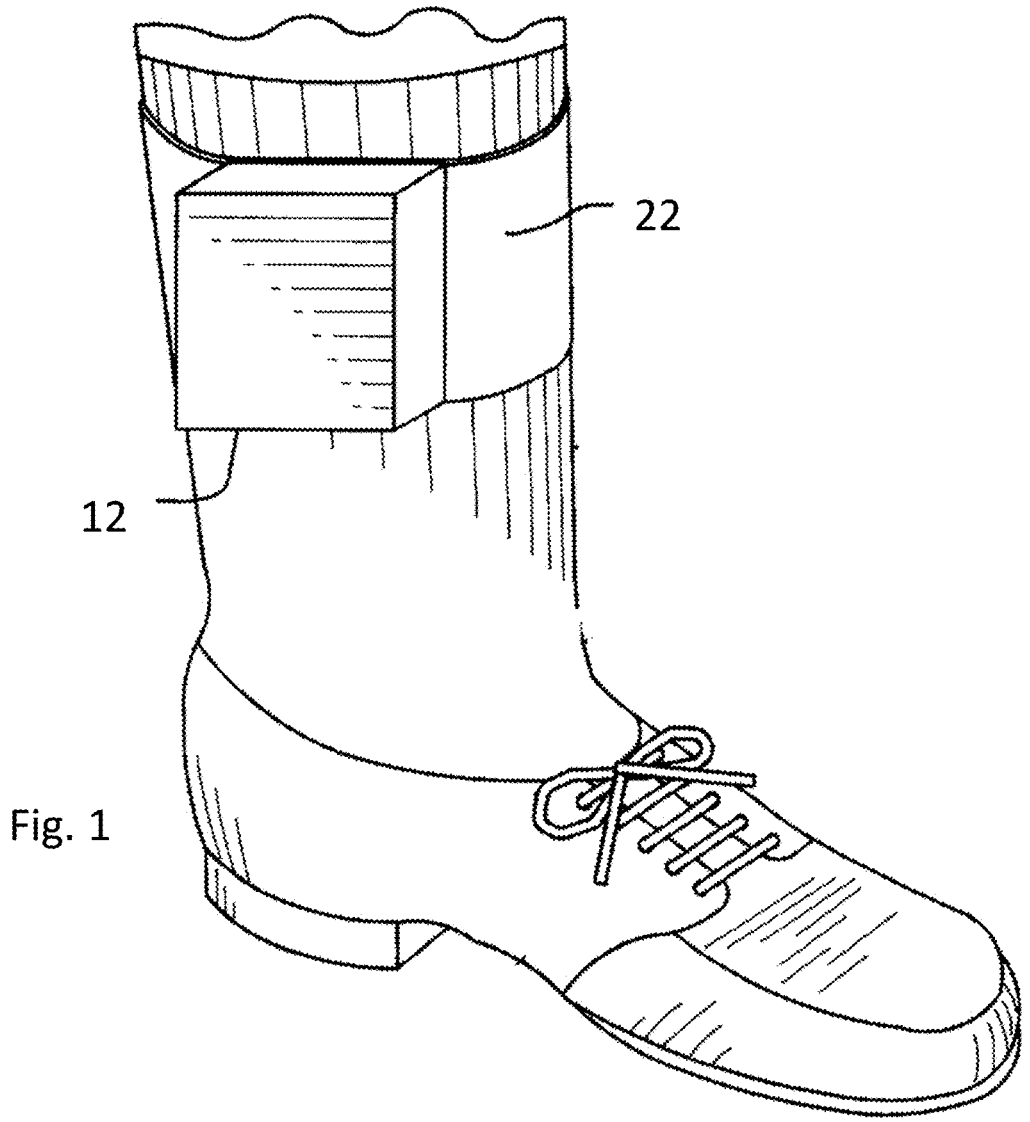
FIG. 1 illustrates an embodiment of a monitoring device attached to an ankle of a user.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. An individual skilled in the relevant art will recognize that other components and configurations may be used without departing from the scope and spirit of the claimed subject matter.

Various embodiments herein relate to identifying circumstances consistent with indirect communications between monitored individuals through unmonitored individuals. Personal monitoring devices detect the presence of proximate wireless access points, such as by way of non-limiting example active Wi-Fi hotspots or active Bluetooth settings from mobile phones carried by unmonitored individuals. If different members of the monitored population encounter the same wireless access point at different locations, this is indicative that the unmonitored individual that possesses the wireless access point is acting as communication courier between the monitored individuals. Various parameters may be set to isolate high priority encounters from innocent/coincidental encounters to reduce the volume of reported encounters and thereby avoid desensitize a supervisory authority to the data.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like. The term "a" means "one or more" absent express indication that it is limited to the singular. "First," "second," etc. are labels to differentiate like terms from each other, and does not imply any order or numerical limitation.

The phrase "monitored population" refers to a group of individuals and/or objects that have issued monitoring devices and are subject to common electronic location monitoring by an oversight system. The phrase "monitored individual" refers to a particular individual in the monitored population.

The phrase "unmonitored individual" refers to a particular individual that is not within a particular monitored population. An unmonitored individual may be under no monitoring at all, or may be a monitored individual within a different monitored population. By way of non-limiting example, jurisdictions often run their own monitoring programs based on equipment from competitors that do not share information with each other. Thus California may have an oversight system and corresponding monitored population for California residents, while Texas may have its own oversight system and corresponding monitored population for Texas residents. If the systems are not compatible or otherwise are not sharing data, then they are two different monitored populations. A monitored individual within California's system would thus be a monitored individual within the California monitored population, but an unmonitored individual within Texas' system because Texas is not monitoring that particular individual.

An "authorized individual" or "supervising authority" would be any one or more people having some type of supervisory responsibility and/or decision making relative to the monitored population or monitored individual therein. By way of non-limiting example, a parole officer would be the authorized individual relative to a parolee. Other non-limiting examples include parent/child, patient/medical supervisor, etc. Security and/or police could be considered a supervising authority relative to a population of monitored individuals to the extent the emergency level intervention is necessary. For sake of brevity, discussion herein is confined to parolee/parole officer relationship, although the invention is not so limited. The invention also applies to objects that can be monitored, such as cars or cargo.

In the concept of devices, a "mobile" device refers to devices that are designed to be routinely carried by individuals without access to utility power; non-limiting examples include cellular phones, tablets, PDAs and laptops. A common feature of a mobile device is an internal battery that allows for extended periods of use while away from utility electrical power. A "stationary" device refers to devices that are designed to be located for extended periods of time in a single location while operating off of utility power; non-limiting examples include desktop PC's, servers and routers. A common feature of a stationary device is either the lack of an internal battery with corresponding full reliance on utility electrical power, or the presence of a battery (internal or external) for limited backup purposes in the case of loss of utility power. Mobile devices may at times be used as stationary devices (e.g., a laptop may be connected to utility power for an extended period of time and used at a single location), and stationary devices may at times act as mobile devices (in that at least any device can be relocated and at least for a brief period be run off of a backup power), but this does not change their classification as mobile or stationary.

In the concept of technologically determining a geographic position of a person or object, the term "location" refers to the position that the technology identifies the person or object to be, as opposed to the actual physical location of the person or object. All such tracking technologies have some degree of margin of error such that any technologically determined location will not be an exact location of the person or object. For example, under certain conditions GPS has a known margin of error within 1-5 meters, and thus the location determined for a person using GPS under those conditions may differ from their actual position by 1-5 meters. Any such technological determinations of position are thus approximate based on the underlying accuracy of the tracking technology and margin of error. Any use of "location" in the specification or claims is to be considered modified by "approximate" to account for such variation whether expressly stated or not.

In the concept of individuals or objects, "fixed location" refers to either a lack of any movement (e.g., sleeping in bed) over a period of time, or small amounts of movement over a period of time within a certain distance or perimeter (e.g., movement within 100 feet, movement within a specific building or address), including considerations in the margin of error for measurement. By way of non-limiting example, an individual who remains at the same street address for a period of time is considered to have been at a fixed location even though they are moving about within the fixed location. If the amount of movement over the period of time is beyond the certain distance or perimeter, then it is no longer attributable to movement within a fixed location. Position changes beyond what can be attributed to being within a fixed location are considered "significantly different".

FIG. 1 shows a block diagram of a monitoring device 12 according to an embodiment of the invention. A monitoring device 12 can determine its location, such as through the Global Positioning Satellite, cell towers, LORAN, wireless local access points, or other known methodologies; for sake of brevity discussion herein is confined to GPS, although the invention is not so limited. Device 12 is shown as a one-piece unit, although multiple pieces as known in the art could also be used.

A band 22 secures a monitoring device to a limb of the user, typically the ankle, via a locking mechanism that preferably can only be opened by an authorized individual. An ankle is shown in FIG. 1, although the invention is not limited thereto. Monitoring device 12 and band 22 preferably have tamper detection capabilities as is known in the art and not discussed further herein. The invention is not limited to any particular securing and/or tamper detection methodology.

Figure 2:
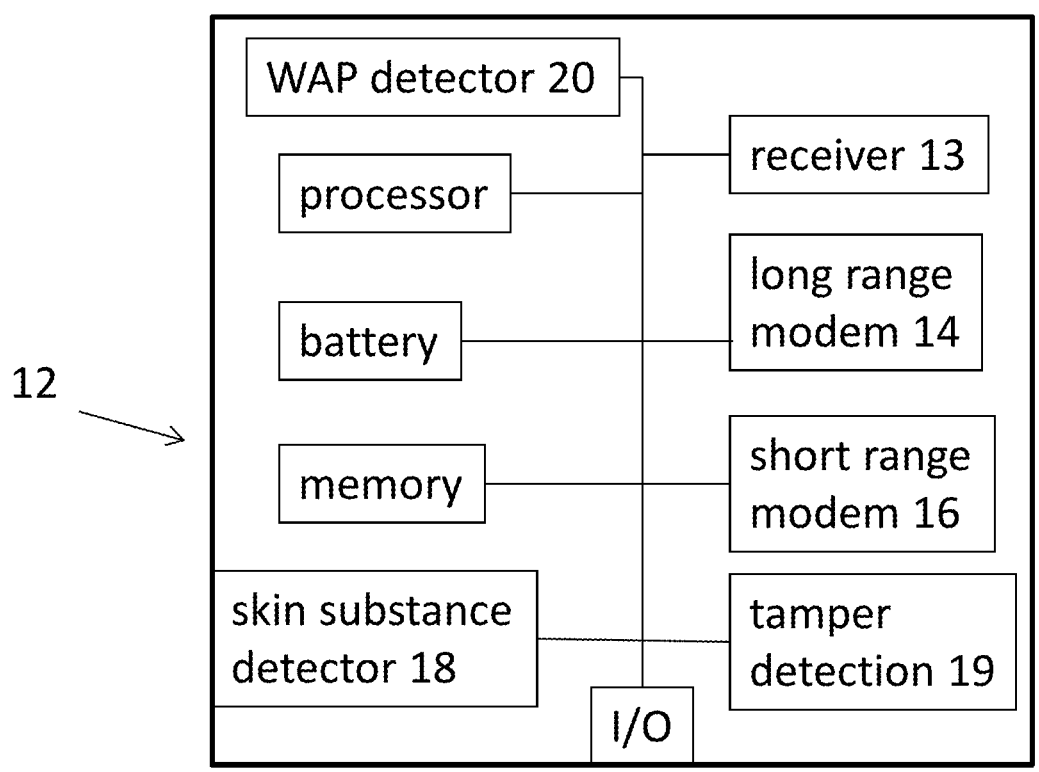
FIG. 2 illustrates an embodiment of the internal components of the monitoring device of FIG. 1.

Referring now to FIG. 2, a non-limiting example of monitoring device 12 includes a dedicated circuit for determining its location, such as a GPS receiver chip 13. A cellular modem 14 preferably provided with a SIM card allows the monitoring device 12 to communicate through the cellular network with a central monitoring station 35. A short range wireless modem 16 (e.g., 915 MHz or 802.11 compatible Wi-Fi or Bluetooth) allows the monitoring device 12 to communicate locally with other devices within the short range as is known in the art for such devices. Modems 14 and 16 may be the same modem operable to communicate on different frequencies. A substance detector 18 may be provided to monitor the presence of prohibited substances in the monitored individual, such as through a sensor in contact with the skin; the configuration of substance detectors within a portable monitored device are known by those of skill in the art and not further discussed herein. Tamper detection mechanism 19 monitors for tamper detection as is known in the art.

Monitoring device 20 also includes a wireless access point detector 20 that detects short range (e.g., maximum range on order of less than hundreds of feet) wireless access points (or "WAP") within range and records information about the detected wireless access points in the memory. By way of non-limiting example, wireless access points may be IEEE 802.11 compatible Wi-Fi hotspots that provide Internet access to network devices as are commonly known in the art of mobile phones and tablets, and the wireless access point detector 20 may be an IEEE 802.11 compatible Wi-Fi finder. In another non-limiting example, devices that communicate via Bluetooth could be wireless access points. A cellular tower is a long range point of access (maximum range on the order of miles) and would not be a short range wireless access point as understood herein.

Batteries, a power port, memory, I/O interface, wired communication access and other supporting computer hardware and software as is known in the art are also preferably provided and not discussed further herein. Monitoring device 12 may be integrated into a single unit or multiple units as is known in the art. The invention is not limited to the details of the architecture of monitoring device 12.

Figure 3:
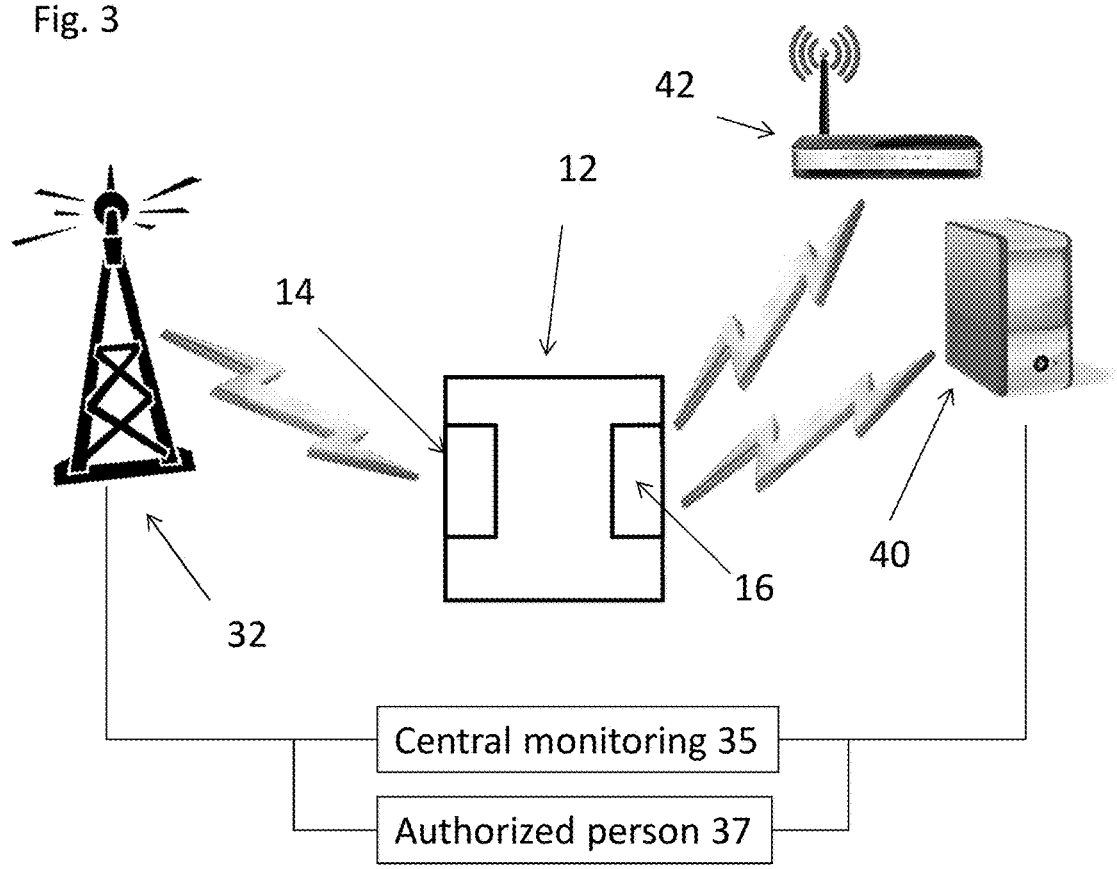
FIG. 3 illustrates an operating environment of the monitoring device of FIG. 1.

Referring now to FIG. 3, monitoring device 12 is shown in an operating environment. Multiple satellites 30 provide the GPS timestamps that GPS receiver 13 in monitoring device 12 converts into location information. The location information represents the approximate position of the monitoring device 12, and by extension the approximate position for the monitored individual, at a particular time. Monitoring device 12 can transmit that information as location data in near real time, and/or can store the location information as location data in memory and batch transfer collected location data as dictated by the need of the system (e.g., on a fixed and/or random schedule, or in response to an event or specific instruction to do so). If substance detection capability is present, then information relating to screening(s) may be similarly stored, transmitted in near real time or batch transmitted collectively, either with or separately from the location data.

Monitoring device 12 preferably has at least two options for remote communications, including data transfer. The first is through the short range modem 16 with a trusted home monitoring device 40 when within the range (e.g., <300 feet, more particularly about 50-100 feet) of the short range modem 16. The second is through the cell/long range modem 14 (potentially miles) to a cell tower 32 when the monitoring device is out of range of the home monitoring device 40. A third option is wireless modem with a wireless access point 42. Preferably cell tower 32, wireless access point 42 and/or home monitoring device 40 connect to central monitoring location 35 and/or an authorized individual 37, whether directly or through intervening equipment (e.g. cell network, Internet) as known in the art.

Wireless access point detector 20 is shown in FIG. 2 as separate from modems 14 and 16, but may be part of those modems or other components. By way of non-limiting example, modem 14 could be a cellular modem, modem 16 could be a separate RF modem, and wireless access point detector 20 could be a distinct Wi-Fi modem and/or Wi-Fi finder component. In yet another example, modem 16 is a Wi-Fi network adaptor that includes Wi-Fi finder hardware and/or software, such that the wireless access point detector 20 is part of modem 16. In still yet another example, modem 14 could be a cellular modem, modem 16 could be a separate RF modem, and wireless access point detector 20 could be a distinct Wi-Fi network adaptor. The invention is not limited to the particular organization or components that define the wireless access point detector 20.

Central monitoring location 35 is "central" in the sense that it serves one or more monitoring devices 12. It may be a single location, multiple locations operating independently, or a distributed arrangement. At a most basic level the central monitoring location 35 is no more than a computer (e.g., a server) having a memory, processor, modem, input/output, and other supporting computer hardware and software as is known in the art, although in practice they may be large facilities with distributed computers and human handlers. Functionality attributed herein to central monitoring location 35 is preferably implemented by software programmed onto electronic computer hardware. The invention is not limited to the architecture or layout of the central monitoring location 35.

The monitoring device 12 obtains geographic location information and identifies proximate wireless access points correlated to the geographic location information, and exchanges that data with the central monitoring location 35 and/or the authorized individual 37. Monitoring device 12 generally transmits data updates to the central monitoring location 35, either via the cell network, the home monitoring device 40 or wireless access point 42 (inclusive of intervening equipment as necessary, such as the cell network).

Figure 4:
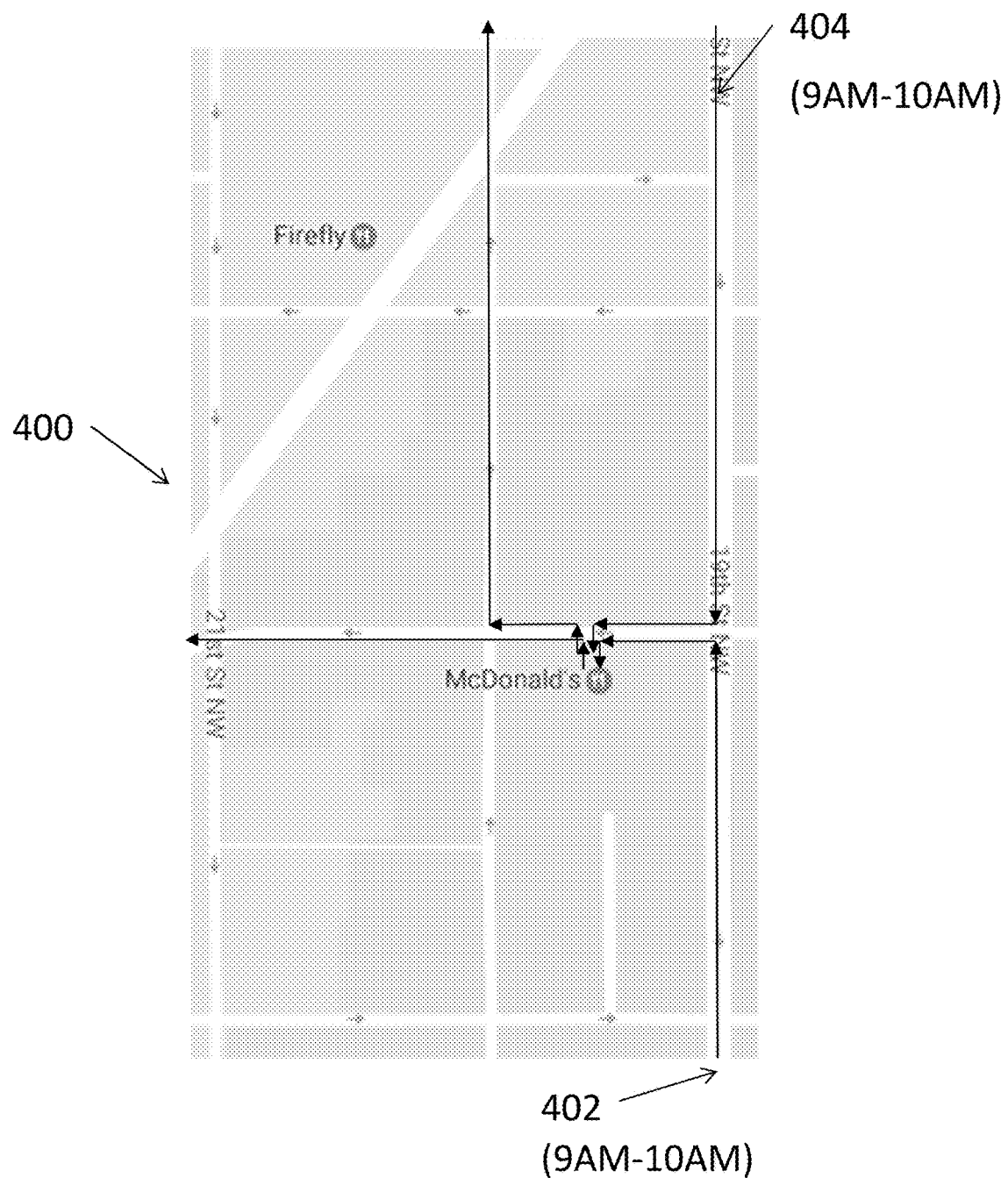
FIG. 4 illustrates movement of two monitored individuals over a common period of time with overlapping location.

A non-limiting example of a monitoring individual's movement and related information that can be derived from corresponding movement data reported by personal monitored device 12 is shown with respect to a map 400 in FIGS. 4-8. In FIG. 4, a monitored individual A moves along a route 402 between 9 AM and LOAM, including a stop at a restaurant (McDonalds) for breakfast. A monitored individual B moves along a route 404 between 9 AM and 10 PM, and also stops at the same restaurant. The corresponding movement data would be recorded by their individual monitoring devices 12 and uploaded to central location 35 as described above. The corresponding data could be visually displayed at central location 35, similar in the manner to which it is shown in FIG. 4 (although more likely shown by dots representing location data at scheduled times taken along the paths). That data would show that the monitored individuals were at the same location at the same time, which can be flagged in a report to a supervisory authority and investigated at its discretion.

Figure 5:
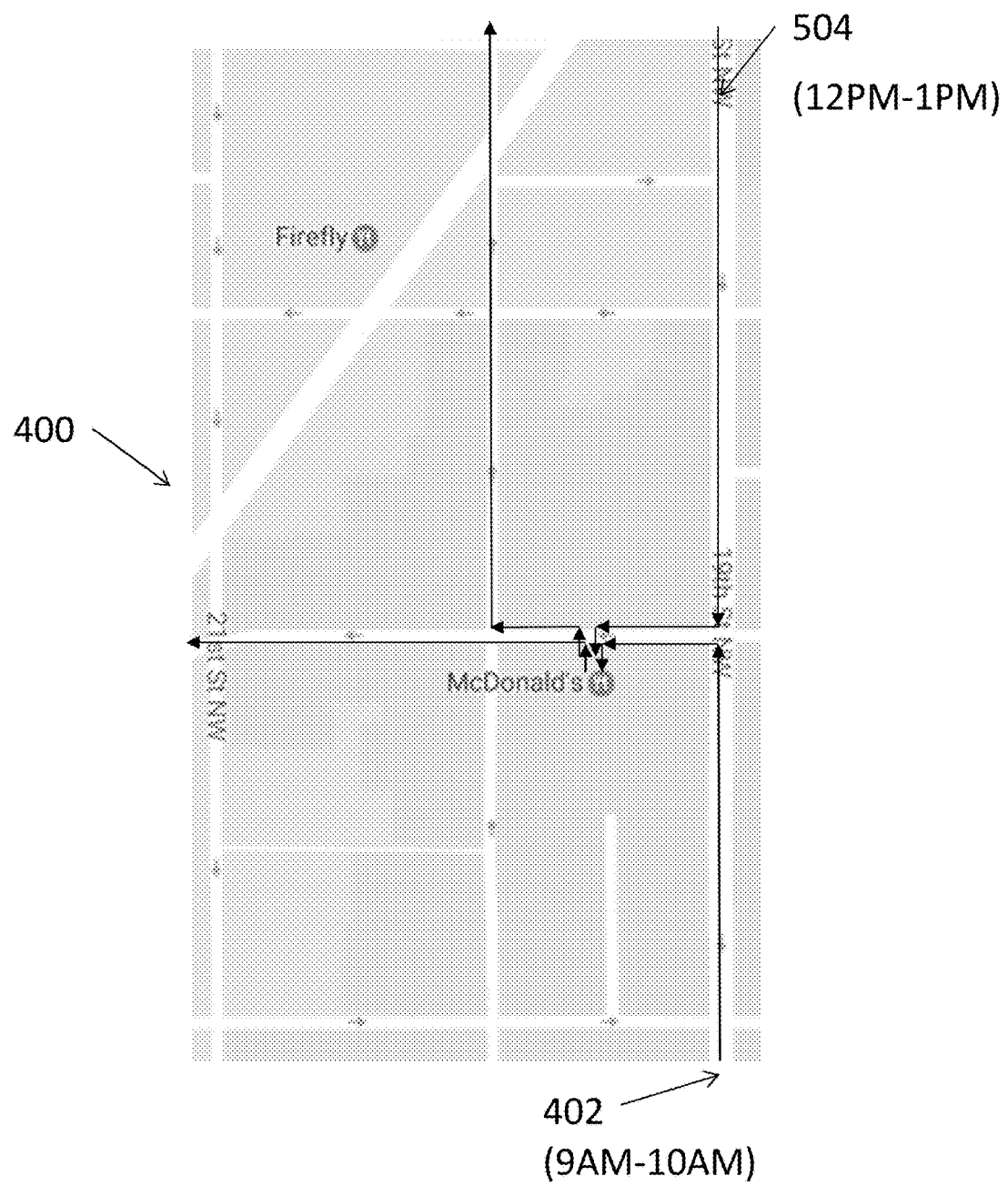
FIG. 5 illustrates movement of two monitored individuals over different periods of time with overlapping location.

In FIG. 5, the routes are the same in location as in FIG. 4, but route 504 of monitored individual B is at a later time of 12 PM-1 PM. The location data thus shows an overlap of location in the routes, but not in time. This may be simple coincidence, or indicate a drop off point to relay items, information or communication. Based on programmed protocols, this may or may not rise to the level of a reportable event based on predetermined criteria established by a supervisory authority. In any event, the overlap is detectable from the location data.

Figure 6:
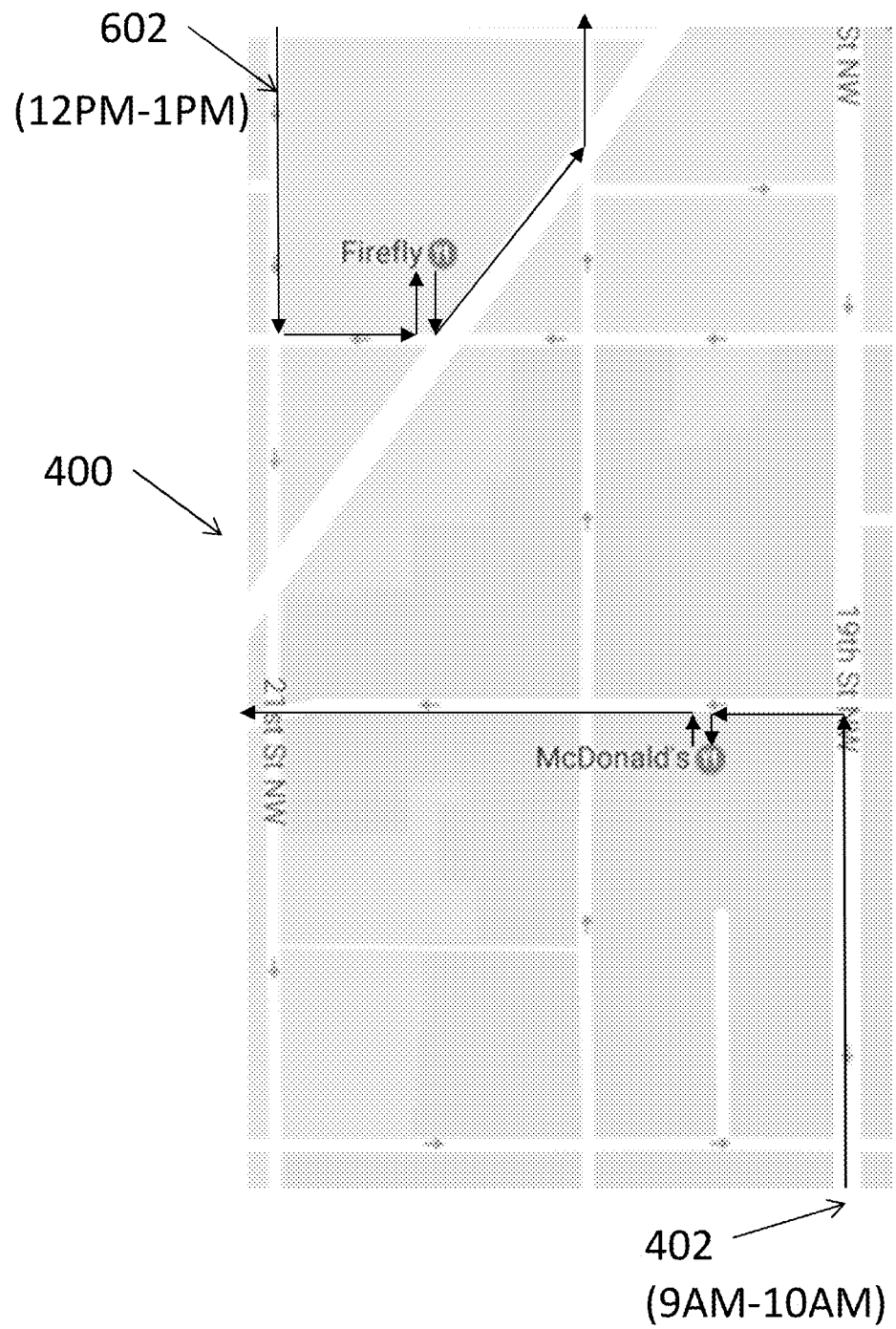
FIG. 6 illustrates movement of two monitored individuals over different periods of time with non-overlapping locations.
Figure 7:
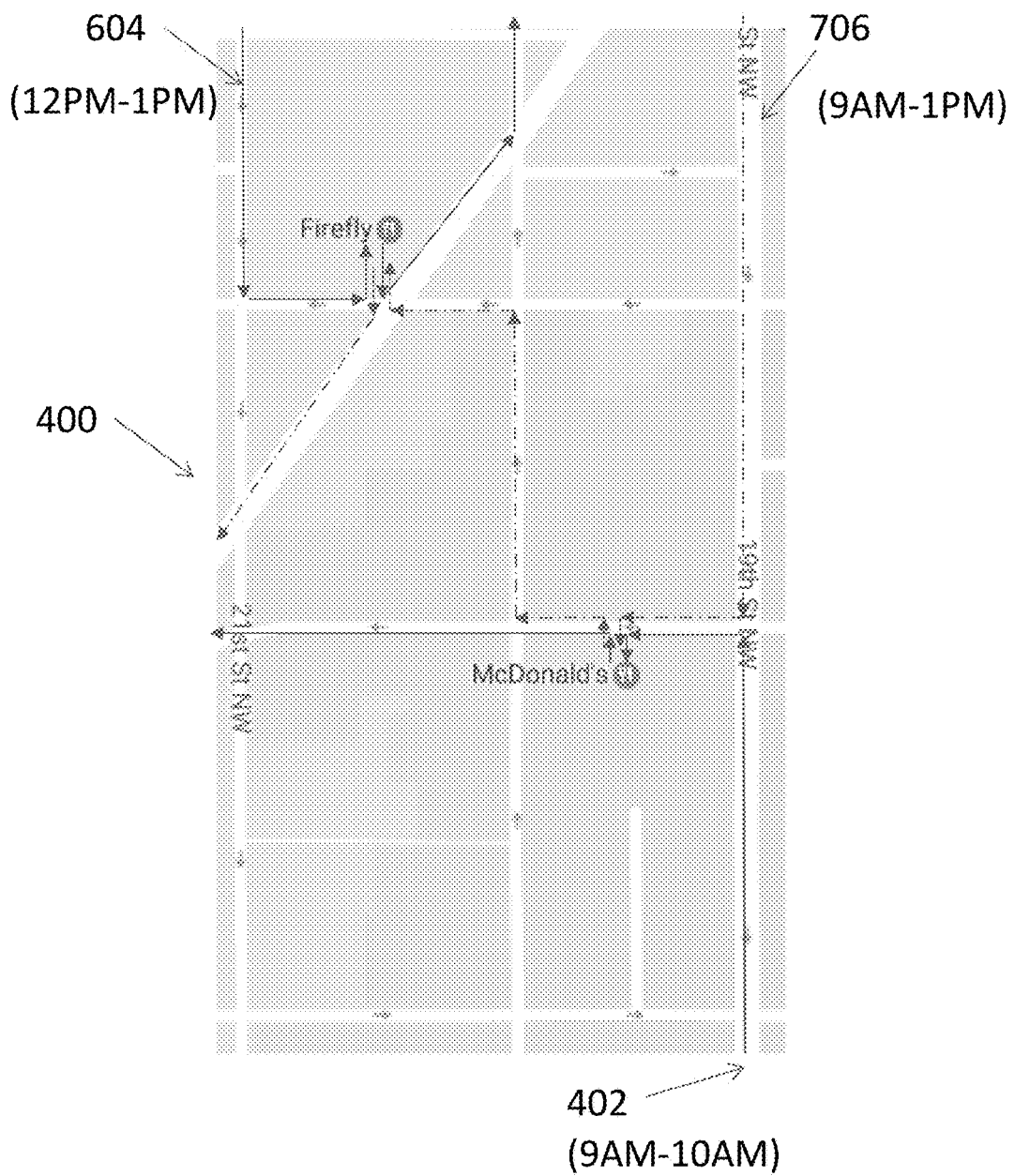
FIG. 7 illustrates movement of two monitored individuals in FIG. 6 relative to an unmonitored individual.

The limits of reliance on location data alone is shown with respect to FIGS. 6 and 7. In FIG. 6, monitored individual A moves along a route 402 between 9 AM and 10AM, including a stop at a restaurant (McDonalds) for breakfast. A monitored individual B moves along a route 602 between 12 PM and 1 PM, including a stop at a restaurant (Firefly) for lunch. The corresponding movement data would be recorded by their individual monitoring devices 12 and uploaded to central location 35 as described above. The two routes are distinct in both time and location, as monitored individuals A and B never encounter each other. The location data therefore does not indicate anything amiss, and thus no basis to inform a supervisory authority.

Referring now to FIG. 7, unnoticed by the location data in FIG. 6 is an unmonitored individual C shown by pathway 706 (shown in dashed lines to indicate that it is not seen by the monitoring system). Unmonitored individual C met monitored individual A between 9 AM and 10AM, and then later met monitored individual B between 12 PM and 1 PM. These two meetings provided an opportunity for unmonitored individual C to relay items, information or communications from monitored individual A to monitored individual B. That relay is not discernable in FIG. 6 by monitoring of the location information alone.

Figure 8:
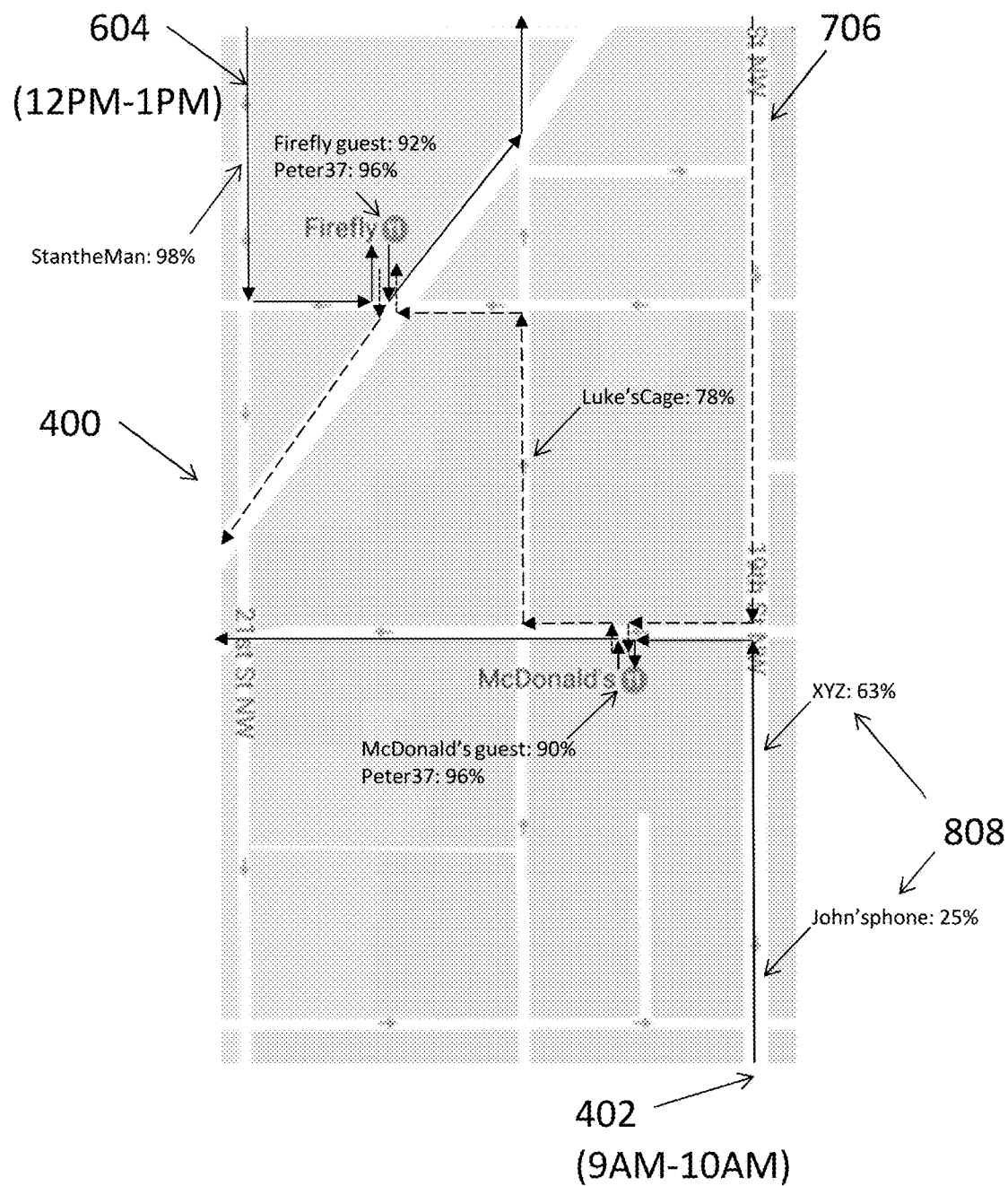
FIGS. 8 and 9 illustrate movement of two monitored individuals in FIG. 7 relative to wireless access points.

Referring now to FIG. 8, the influence of the wireless access point detector 20 is shown relative to the pathways of FIG. 7. In this example, there are a variety of mobile and fixed wireless access points that monitored individual A and monitor individual B encounter along their respective routes. Wireless access points 808, such as a mobile Wi-Fi hotspot on phones as identified by their network names, are present as consistent with the environment. Mobile access points encountered include the network named "Peter37" for unmonitored individual C, and coincidental encounters with networks named "John's phone," "XYZ," "Luke's Cage," and "Stan the man." Stationary wireless access points include the "McDonald's guest" and the "Firefly guest" networks. Wireless access point detector 20 in each monitored device 12 stores in the memory information that identifies the encountered wireless access points 808 (e.g., SSID network name, MAC address), along with location and time at which device 12 detects the wireless access point.

As discussed in more detail below, the collected location data and wireless access point data collectively can indicate that monitored individuals A and B interacted at different times and/or locations through an unmonitored individual C. In the example of FIG. 8, the monitoring devices 12 for both monitored individual A and B detected the presence of the wireless access point "Peter37" at different times and locations. Processing at monitoring device 12 and/or central location 35 can identify that overlap. That relationship may indicate the owner of "Peter37" (unmonitored individual C) was acting as an intermediary between monitored individual A and monitored individual B that can be flagged for reporting to the supervisory authority. The detection of wireless access points 808 in conjunction with location data thus identifies a potential relationship between monitored individuals A and B that would have gone unnoticed by consideration of the location data alone.

In theory, the above methodology can be run for every tracked location data point and for every detected wireless access point 808. However, such use may generate too many matches of coincidental or innocent activity. By way of non-limiting example, an overlap could be detected if the monitored individuals frequented the same coffee shop and detected its wireless access point, albeit at different times; no activity of concern is present, yet the sheer volume of such meaningless encounters (which likely would dwarf improper encounters of interest) may desensitize the supervisory authority to the data, such that improper events go uninvestigated. Such use may also place strain on computing resources. The above embodiments may therefore have one or more optional features to limit the identification and/or reporting of encounters to circumstances that are considered more consistent with improper activity.

One such optional feature is for device 12 to consider how the nature of the relationship between detector 20 and the wireless access point 808 may indicate the presence or absence of contact with an unmonitored individual. One such relationship reflected in FIG. 8 is the received signal strength of the wireless access point 808. A detected higher signal strength may indicate that the monitored individual and the wireless access point 808 are physically close enough (e.g., on the order of less than about 10 feet) together to allow for spoken communication or the transfer of items, whereas a detected lower signal strength indicates that the two are not close enough together to facilitate such communication or transfer. Personal monitoring device 12 may be able to identify "qualifying" detected wireless access points 808 based on such predefined parameters; if no parameters are set or required than all wireless access points 808 are considered qualifying, whereas other set parameters (e.g., signal strength >75% maximum) would designate only certain wireless access points 808 as qualifying. The invention is not limited to what parameters are set to differentiate qualifying from non-qualifying.

By way of non-limiting example, the encounter for "John's phone" at 25% signal strength may be indicative of coincidental encounter at a distance not involving communication, and could be disregarded (at least as a correlating event); due to the low signal strength the monitoring device 12 may not even store and/or upload the encounter, or it may store and upload the encounter and leave it to central monitoring location 35 to judge the encounter as coincidental and not meriting further action. In contrast, the encounter for "Stan the man" at 98% may be indicative of close proximity to allow for communication and/or item transfer, which would likely be reported to central monitoring location 35 and acted upon as appropriate.

Preferably the signal strength should be at least 60% to be considered a meaningful encounter, although the invention is not so limited and any threshold may be set. Multiple thresholds may also be set in which certain thresholds carry a degree of risk. By way of non-limiting example, 60% may be a high risk proximity, below 30 percent may be a non-risk proximity, and the 30-60% may be a moderate risk proximity. Different levels of risk may be treated differently by the central monitoring location 35 and/or supervising authority.

FIG. 8 shows an example in which the high signal strength (96%) in both encounters by monitored individual A and B with wireless access point "Peter37" indicated individual-to-individual communication with unmonitored person C. This could be of interest to the supervising authority and thus a reportable event.

Figure 9:
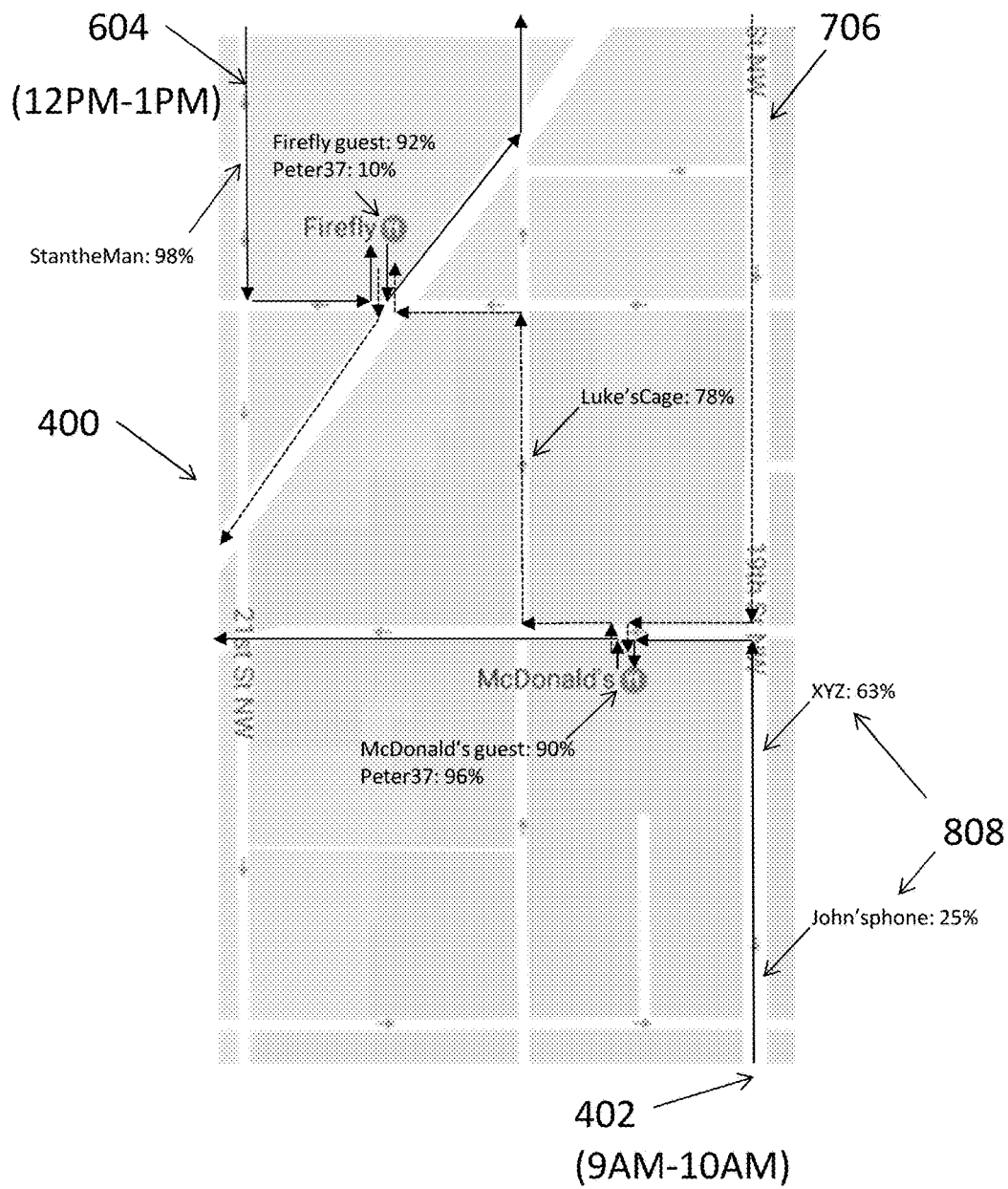

FIG. 9 shows a similar example, in which the signal strength for the encounter with "Peter37" with monitored individual A is 96% and monitored individual B is only 10%. This would tend to indicate that the first encounter was individual-to-individual, while the second encounter was not; it is therefore unlikely that the unmonitored individual C was acting as a go-between. To the extent that the second encounter was even uploaded, central monitoring location 35 could dismiss the overlap as failing to justify supervisory intervention, and thus preventing a potential false positive.

Another optional feature is to limit the overlap inquiry to only wireless access points 808 that are mobile, at least when reliable location data is available. The rationale is that overlap at stationary wireless access points would be identifiable from the location data (when available) such as shown in FIG. 5. In such cases the location data would already indicate the geographic overlap, such that the wireless access point data would be duplicative (and either serve as a backup or disregarded to avoid application of computer resources to consider).

It is possible that a wireless access point 808 may self-identify, or provide a self-identifying characteristic by which it can be determined to be a mobile device rather than a stationary one (e.g., the device may identify itself as a mobile phone). In the absence of such defining characteristics, whether the wireless access point 808 is mobile or stationary can be determined by the location data of the monitoring devices 12 that detects wireless access point 808. As noted above, when wireless access points 808 are detected by wireless access point detector 20, that information is associated with the corresponding location data. In FIG. 8, the wireless access point named "Peter37" is detected at McDonald's between 9-10AM and Firefly between 12-1 PM. Central monitoring location 35 can identify from the reported data that "Peter37" was detected at two distinct locations. The difference in location between the two readings indicates that the wireless access point is mobile, rather than stationary. If the locations had not changed (e.g., if the monitoring devices both detected the same McDonald's hotspot in the embodiment of FIG. 5), then this would tend to indicate that the wireless access point is stationary, rather than mobile. The embodiments would prioritize the mobile wireless access points, and/or deprioritize/disregard the stationary wireless access points. To the extent the device provides its location, that location could be stored by device 12 and monitored for location changes over time consistent with a mobile device.

The above comparisons would account for a range of error within the location data to allow for variances consistent with wireless access points. A non-limiting example of such variance is the known margin of error (e.g., GPS is 1-5 meters). Another non-limiting example is that a wireless access point can be relocated within a common area (e.g., moving a wireless router from one room to another). Such insubstantial differences in location, such as on the order of less than 100 feet or within a common street address, could be judged consistent with a common location. Larger differences than exceed what could be attributed to the predetermined parameters (allowable margin of error) could be considered significant and consistent with a relocation or movement from one location to another, which is indicative of a mobile wireless access point.

Yet another optional feature is to disregard associations with wireless access points that are trusted and/or which are representative of trusted areas. For example, detected overlap by different monitored individuals with wireless access points at a parole office or a halfway house may not indicate improper activity worthy of investigation. Similarly, the hotspot or Bluetooth of a parole officer's individual phone would show considerable overlap with different parolees, but is not indicative of activity worthy of investigation. The system can flag the same, which could exclude the association from consideration in the search for overlap, and/or disregard any such identified overlap.

Still yet another optional feature is to disregard or deprioritize detected wireless access points in which the monitored individual was in motion, in favor of prioritizing situations in which the monitored individual was at a fixed location for at least a predetermined period of time (e.g., 5 minutes, although the invention is not so limited). The rationale reflects a potential belief that meetings are more likely to occur at a fixed location as opposed to while in motion.

Yet another optional feature is to identify the owner of the wireless access point and determine whether they have a relevant (e.g., criminal) history. Such information is available in appropriate databases (obstacles to cross referencing with location data being largely political and/or legal rather than technological). If the inquiry shows that the unmonitored individual C is a known criminal or has other relevant background of interest, such background may warrant further investigation and/or higher risk assessments than if no such background or criminal record is evident.

Yet still another feature is to exclude, deprioritize and/or disregard wireless access points that are detected for less than a predetermined period of time. Such a feature would tend to exclude encounters where the monitored individual and unmonitored individual were simply walking past each other.

Figure 10:
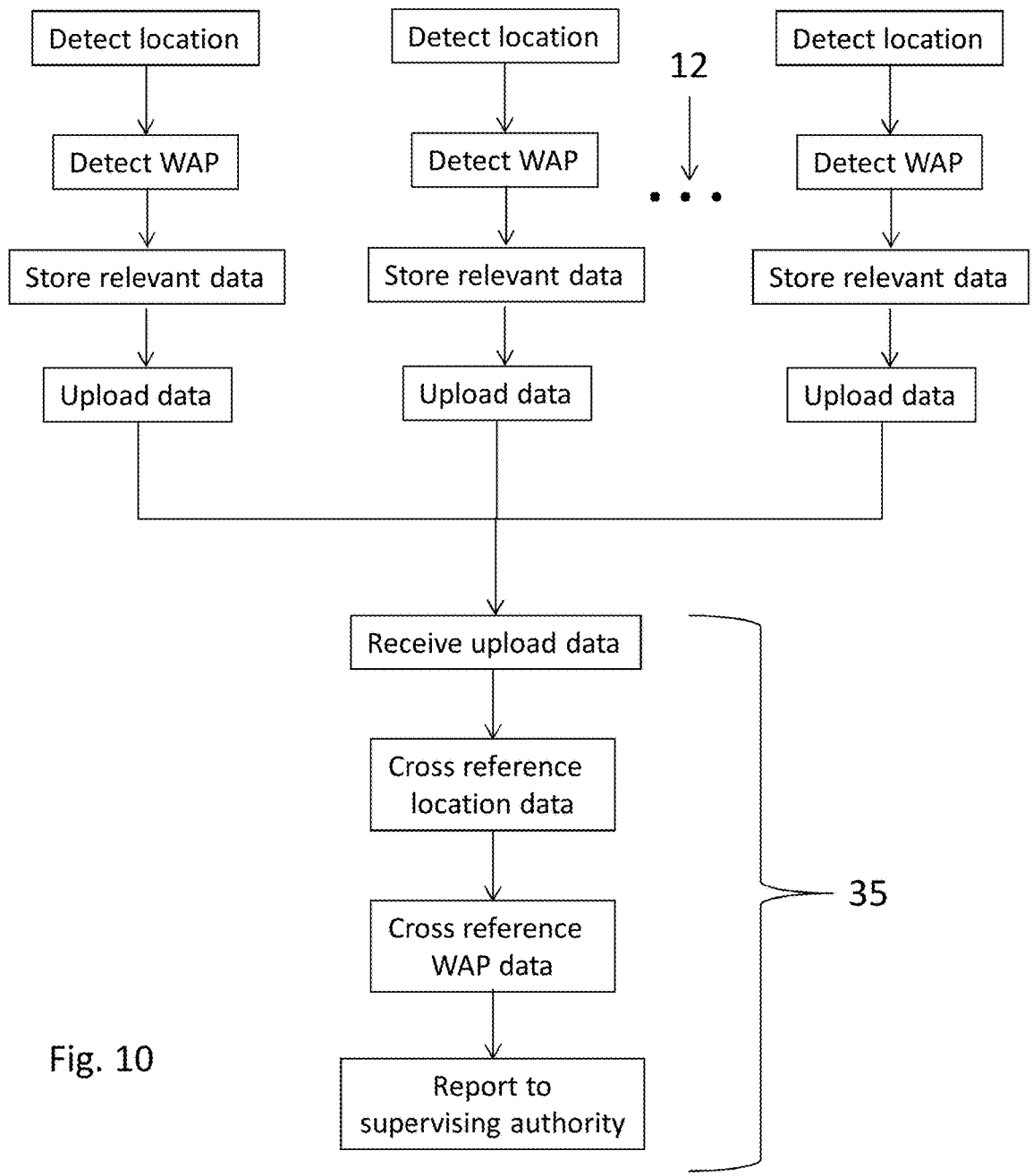
FIGS. 10-15 and 18 are flowcharts of embodiments of the invention.

Referring now to FIG. 10, a flowchart for operation of an embodiment of monitored devices 12 in cooperation with central monitoring location 35 is shown. In the embodiment of FIG. 10, each monitored device 12 is programmed to determine and record its location on a first schedule, to detect any qualifying proximate wireless access points 808 and record associated data on a second schedule, and to upload accumulated location and wireless access point data on a third schedule. By way of non-limiting example, device 12 could determine its location once every minute, detect wireless access points 808 once every 5 minutes, and upload the collected data to central monitoring location 35 once every 15 minutes. These schedules are not absolute, in that as is known in the art circumstances may prevent or delay collection and/or upload of data (e.g., inside a building there may be a lack of GPS signals and/or cellular access), for which monitored device 20 may account for the same by known protocols (e.g., trying to collect/upload at a later time).

Whether a detected wireless access point 808 is considered qualifying is based on predetermined parameters and may be any or all of the options discussed above. For example, all detected wireless access points 808 may be logged and uploaded. In the alternative, only some may be logged and/or loaded based on predetermined criteria, by way of non-limiting example signal strength, authorized v. unauthorized access points, mobile v. stationary access points, fixed location v. in motion, etc. The invention is not limited to the parameters for delineating qualified v. unqualified access points for purposes of processing, storage, uploading, etc.

Central monitoring location 35 receives the uploaded data and cross references the location data in a manner known in the art (e.g. comparing movement to crime scenes to detect overlap). Central monitoring location 35 also cross references the received data for qualified overlapping encounters of different monitored individuals with the same wireless access point 808 and reports the same to the supervising authority. Whether an overlapping encounter is considered qualifying is based on predetermined parameters. For example, all encounters may be considered qualifying. In the alternative, only some may be logged and/or loaded based on criteria, by way of non-limiting example signal strength, authorized v. unauthorized access points, mobile v. stationary access points, fixed location v. in motion, etc. The invention is not limited to the parameters by which encounters are considered qualifying.

Figure 11:
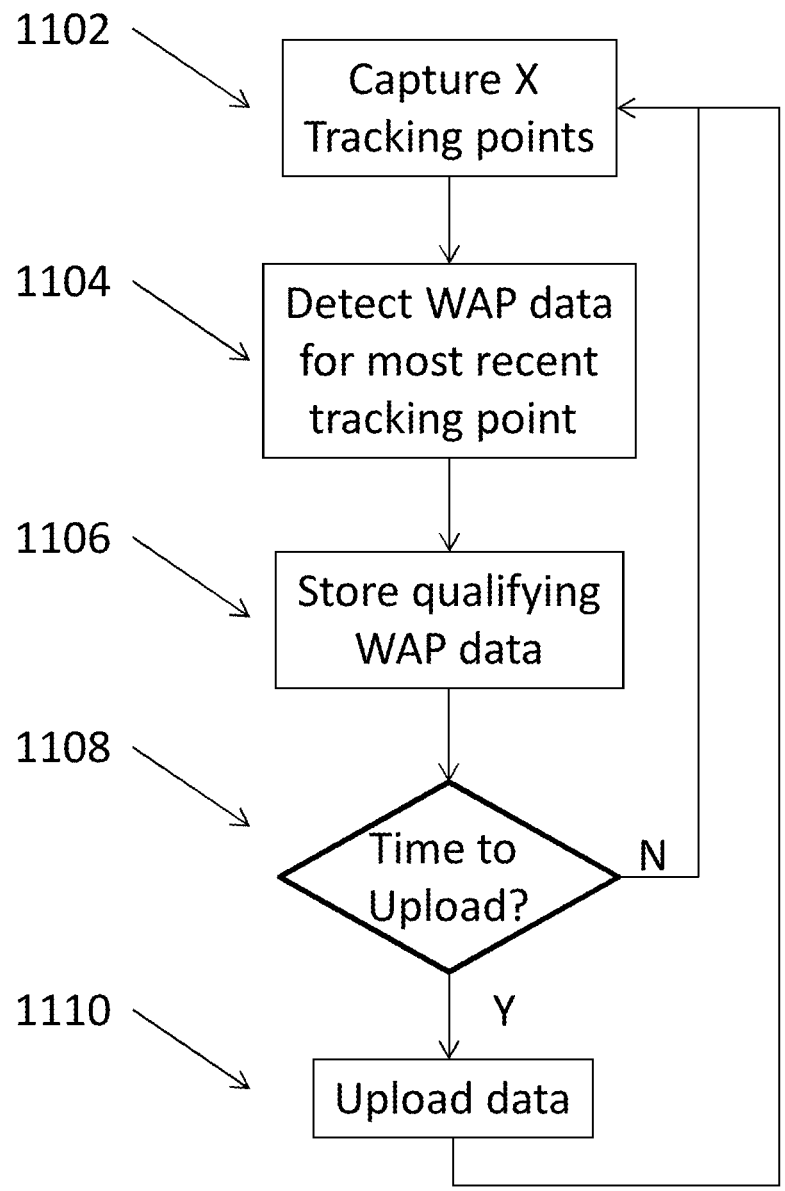

Referring now to FIG. 11, a flowchart for operation of an embodiment of monitored devices 12 is shown. At step 1102, the individual monitoring device 12 will determine its location X times (e.g., 5 times) and record corresponding tracking points TP (time stamp and corresponding location). At step 1104 wireless access point detector 20 detects the presence of any proximate wireless access points 808. At step 1106 device 12 stores data on the detected wireless access points 808, such as any received identification information and/or characteristics, in association with the corresponding tracking point (which will give the location and time at which the wireless access point 808 was detected); as noted above this may be for all detected wireless access points or only those meeting certain predetermined parameters (e.g., wireless access point has a minimum signal strength, is a known/confirmable stationary access point). At step 1108 device 12 determines if it is time to upload the accumulated data (e.g., the number of collected points has reached a threshold, a certain time has elapsed since the last upload, urgent/override conditions); if not control returns to step 1102, otherwise the data is uploaded at step 1110 before control returns to step 1102.

In the above embodiment wireless access points 808 are detected more often than location data yet less often the upload of the accumulated data. However, the invention is not so limited, and the schedules may be the same, different, overlap, or entirely unrelated. The invention is not limited to the timing and/or nature of data collection.

Figure 12:
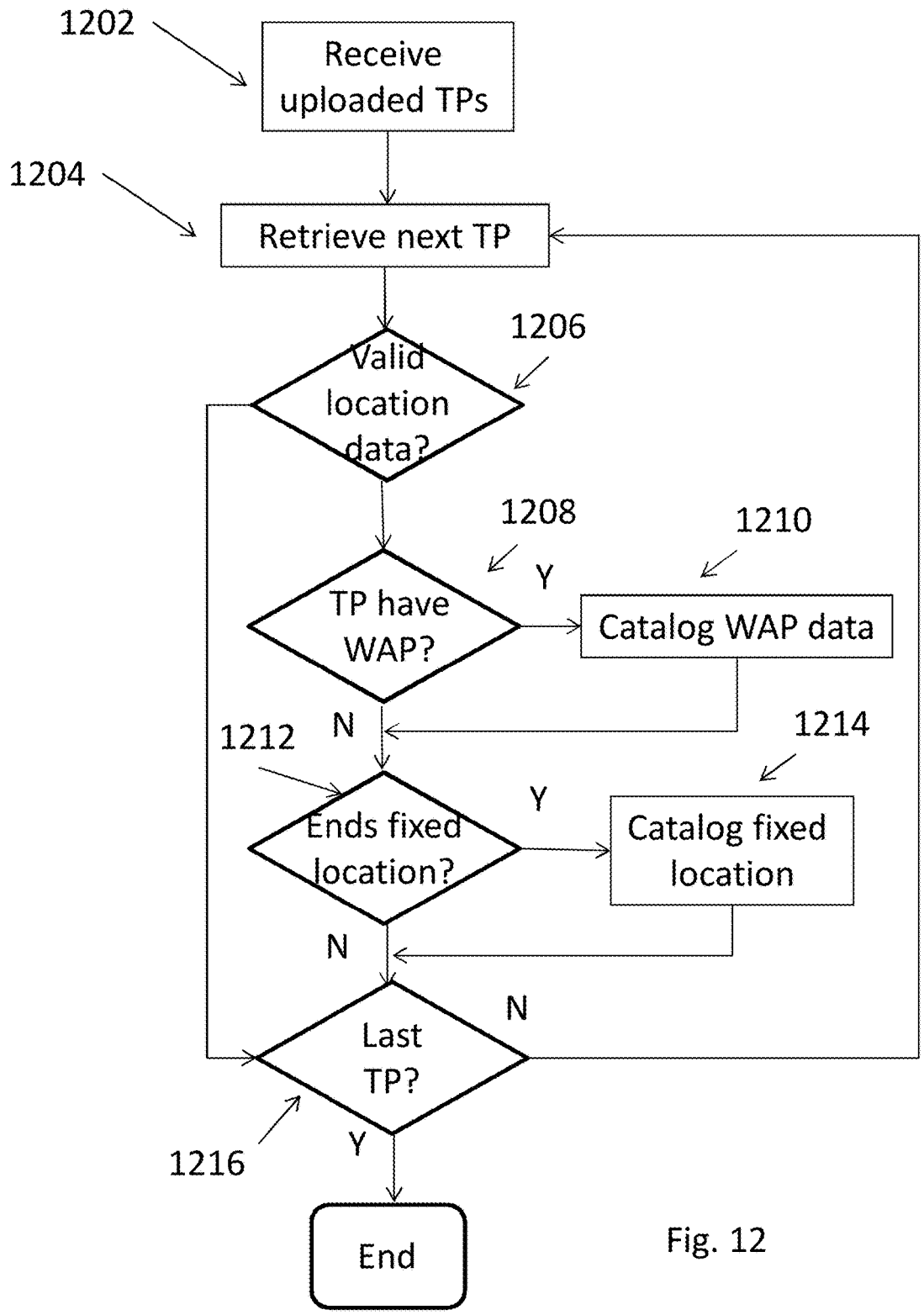

Referring now to FIG. 12, a flowchart is shown for operation of an embodiment of central monitoring location 35 receiving and processing tracking point data. At step 1202 the central monitoring location 35 will receive the uploaded tracking points from the devices 12 of the monitored population. All the tracking points are examined sequentially via steps 1204 and 1206, and the process ends when the last tracking point is reached at step 1216. Each tracking point is examined at step 1206 to see if it has valid tracking data; if not, control passes to step 1216 to move on to the next tracking point. At step 1208 each tacking point with valid location data is then examined for the presence of a detected wireless access point 808. If so, the access point and associated location data are catalogued at step 1210 before control passes to 1212; either step 1208 or 1210 may include filters to only consider access points that meet certain criteria (e.g., minimum signal strength) as discussed herein. At step 1212 the system determines if the tracking point ends a period of time at a fixed location (i.e., the monitored individual has transitioned from a period of time at a fixed location to a period of movement), and if so at step 1214 catalogs the fixed location and time spent there as a "visit" before control passes to step 1216.

Figure 13:
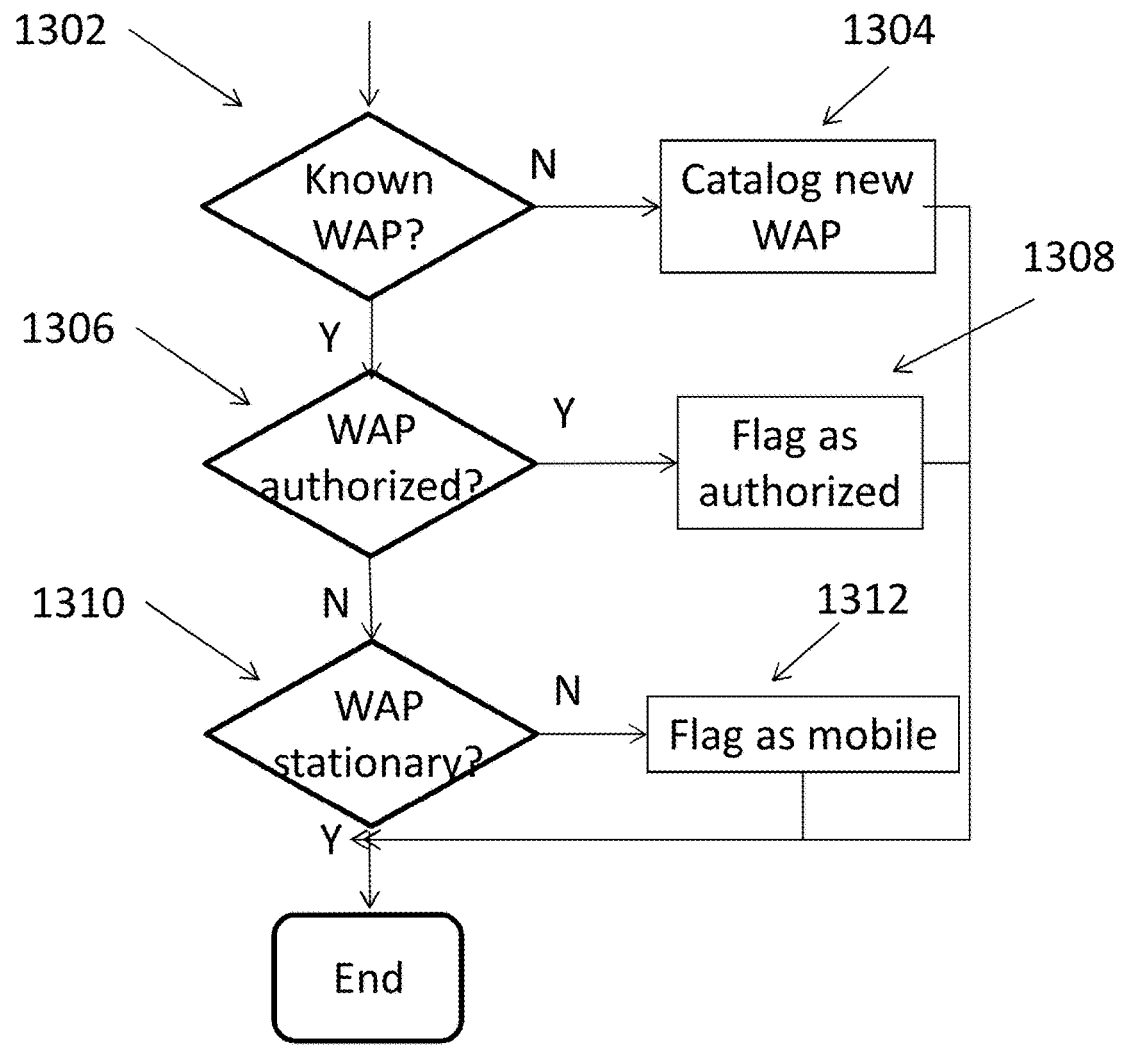

Referring now to FIG. 13, a flowchart for an embodiment of cataloging a wireless access point at step 1210 is shown. At step 1302, the system cross references the detected wireless access point with a database of previously encountered wireless access points. If there is no prior encounter, the wireless access point is cataloged in the database at step 1304 as a new hotspot along with its location data for future reference; this may include a sub-step of consulting other databases or resources for information about the hotspot (e.g., owner, criminal record, known affiliations). At step 1306 if the wireless access point corresponds to an authorized source (e.g., a halfway house, a probation officer), then the wireless access point is flagged as authorized at step 1308. At step 1310, the system determines whether the wireless access point is stationary or mobile by comparing the currently detected location relative to any prior detected location(s); little or no movement (e.g., within a predetermined distance, within a particular building, etc.) indicates stationary while greater movement indicates mobile. If the comparison indicates mobile, then the wireless access point is flagged in the database as mobile at step 1312.

Figure 14:
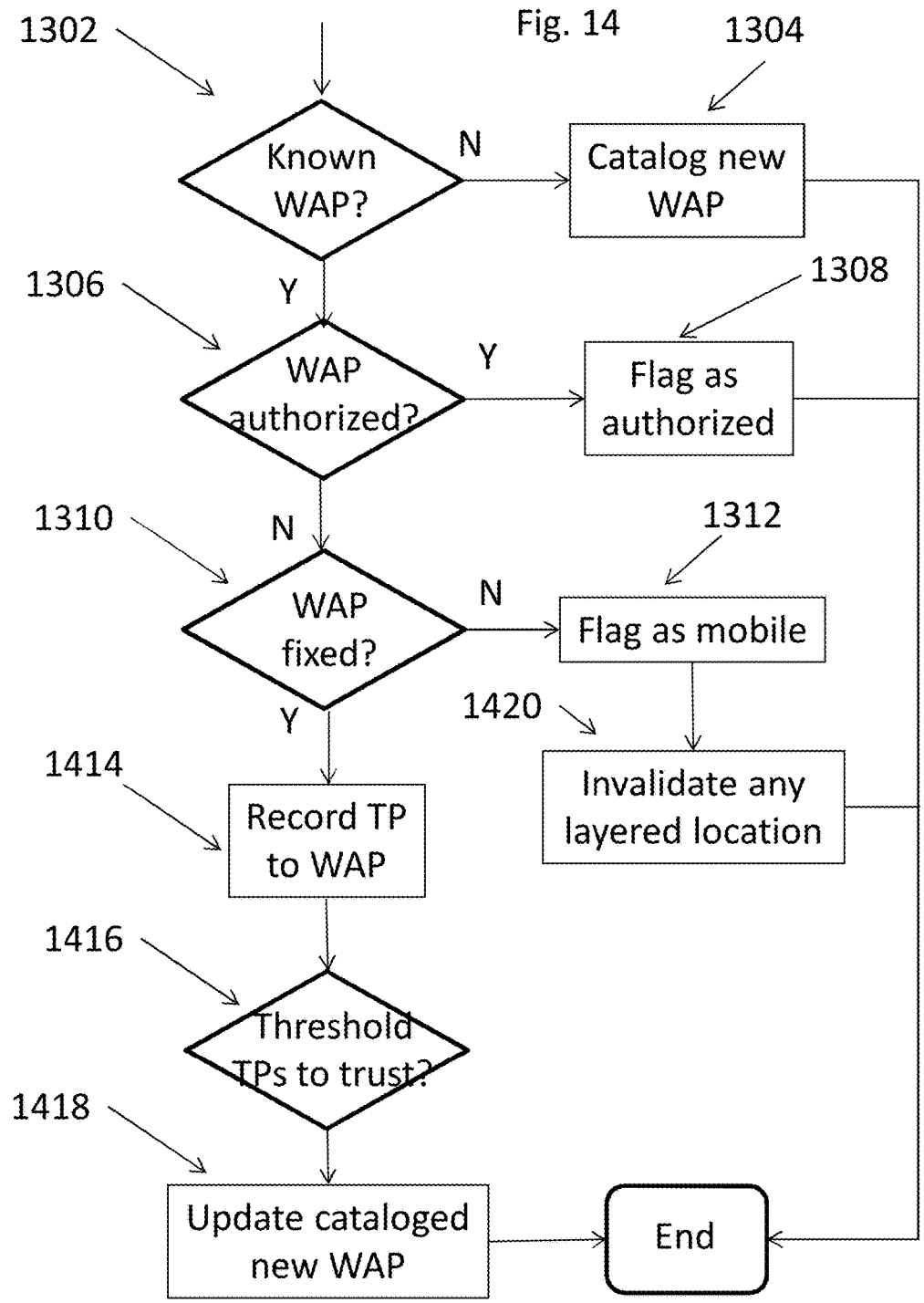

FIG. 14 shows a flowchart for another embodiment of cataloging a wireless access point at step 1210 is shown, which has additional steps beyond 1302-1312 of FIG. 13. As is known in the art, stationary wireless access point with known locations can be used to enhance the accuracy of location methodologies, in some circumstances being the sole source of location information when other sources are not available; this is often referred to in the art as "layered location." The embodiment of FIG. 14 uses the determination of whether the detected wireless access point is stationary or mobile at step 1310 to support or counter that usage. Thus if the wireless access point is determined to be stationary at step 1310, then the location of the wireless access point is used at steps 1414-1418 in a known manner for layered location purposes. In contrast, if the wireless access point is determined to be mobile at step 1310, then any prior reliance of the wireless access point for layered location purposes no longer applies, and at step 1420 any such prior layered location reliance is invalidated.

Figure 15:
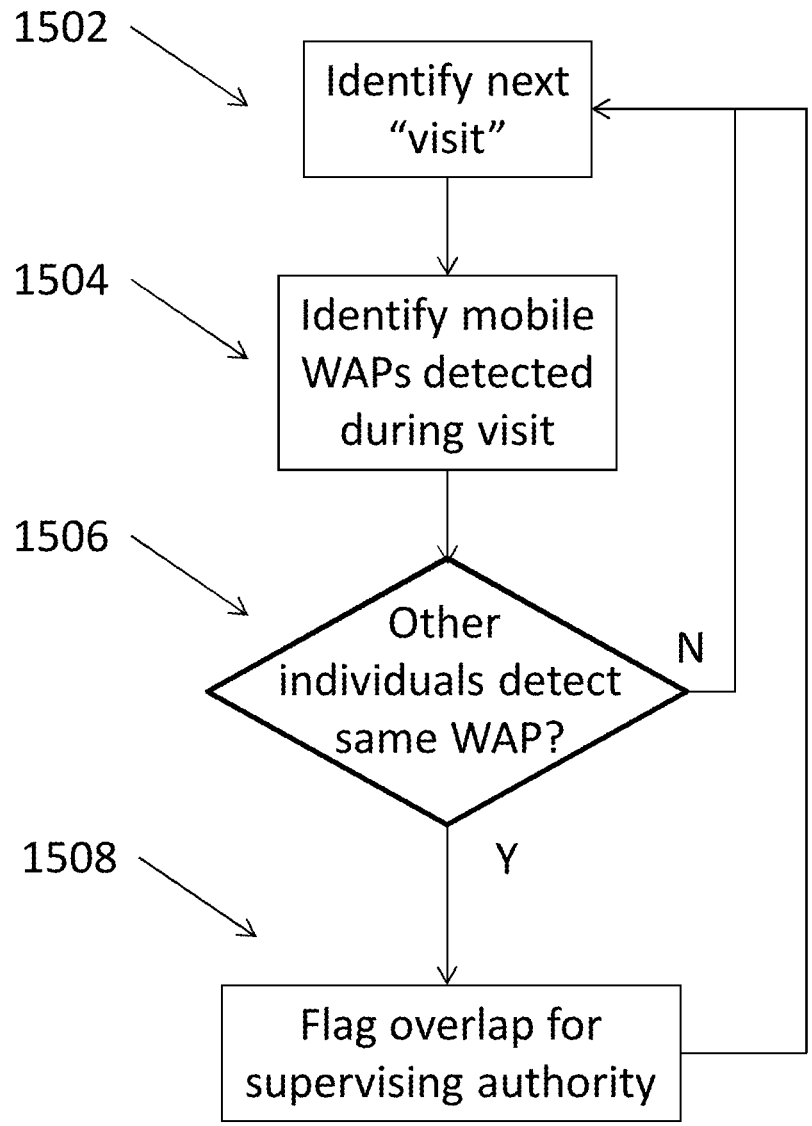

As discussed above, central monitoring location 35 cross references incoming and stored wireless access point data for a monitored individual to identify any overlap with different monitored individuals that encountered a common wireless access point. This could be done for all recorded points, but as noted above this would likely include too many innocent encounters, and require considerable computing resources. FIG. 15 shows a flowchart of an embodiment for identifying encounters with a higher potential degree of relevance by focusing on mobile wireless access points detected while device 12 was at a fixed location for a minimum period of time; thus lower priority incidental/accidental encounters and/or stationary access points are disregarded.

At step 1502, the system identifies when the monitored individual has been at a fixed location for a minimum period of time (e.g., 5 minutes), hereafter referred to as a "visit." At step 1504, the system identifies any mobile wireless access points detected during the visit. At step 1506, the system determines whether any other monitored individual that also encountered that same wireless access point(s) during one of their visits; this may be based on a time window (e.g., 1 day) to avoid outdated encounters. If there is no overlap, then the process repeats with the next visit. If overlap does exist, then at step 1508 a flag is set to indicate the overlap for reporting to the supervising authority. A visit can also be defined by time in combination with other factors, such as signal strength or other indication of proximity, e.g., a time as short as a minute but with a high metric of physical proximity. The invention is not limited to the parameters by which an encounter is considered a visit.

The focus on visits as opposed to all data points substantially reduces applied computing resources, as any particular monitored individual may only have 3-5 visits per day (e.g., at home, at work, a restaurant, a parole meeting) compared with potentially hundreds of data points collected on a schedule (e.g., a 5 minute schedule for wireless detector 20 can generate potentially 228 data points a day). A visit may also be a more relevant indicator of an improper meeting as opposed to a random encounter. Focusing on encounters with mobile wireless access points during visits thus presents a considerably smaller pool of higher priority encounters for consideration and investigation. The resulting identifications of such encounters will be a more manageable number that is less likely to desensitize the supervisory authority.

The above embodiments identify possible interactions between a monitored person A and B through an unmonitored person C based on common encounter with a wireless access point carried by unmonitored person C. According to another embodiment of the invention, the system could identify possible interactions between a monitored person A and B through an unmonitored person C in combination with an unmonitored person D.

Figure 17:
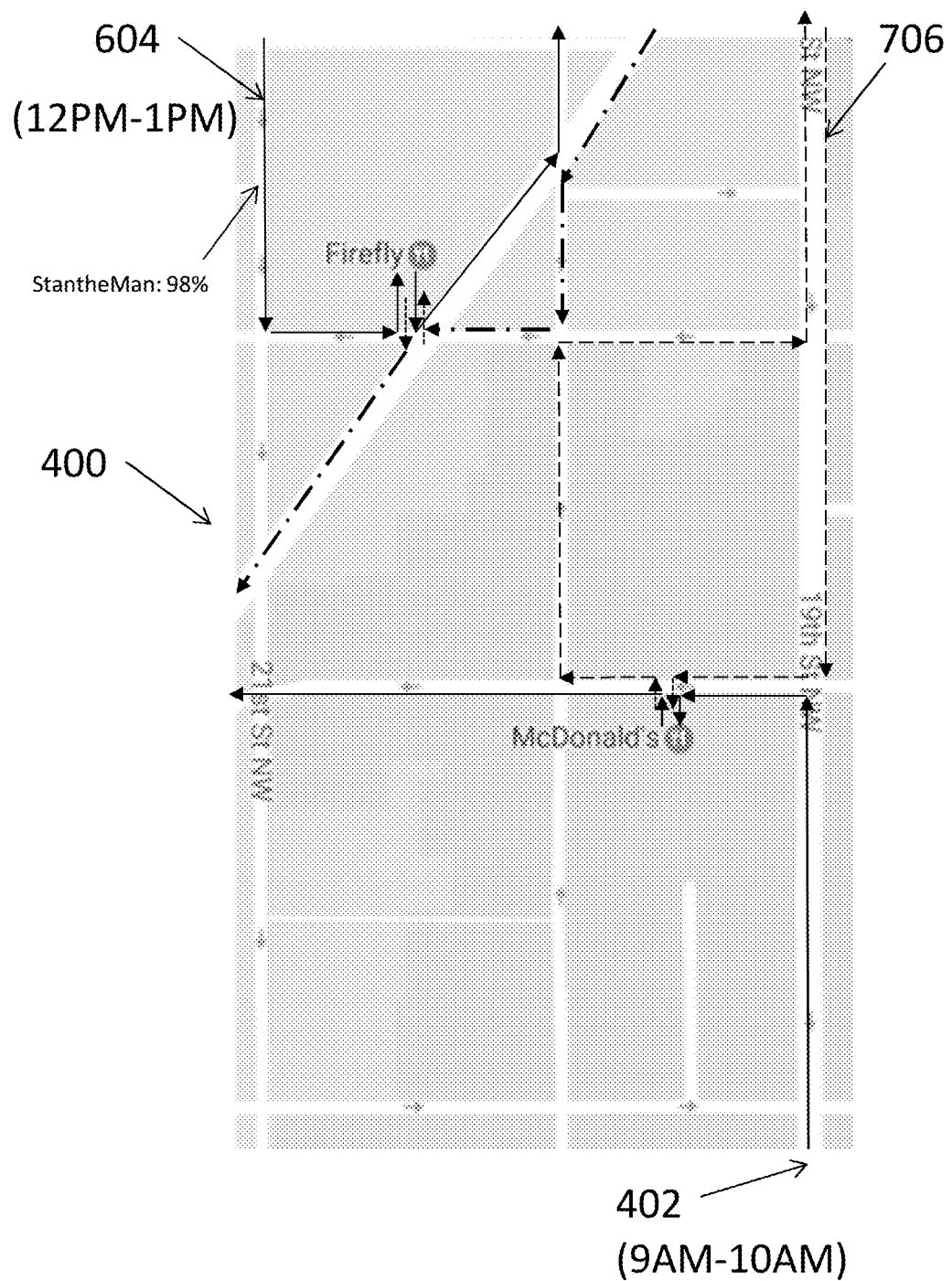
FIG. 17 illustrates movement of two monitored individuals in FIG. 6 relative to two unmonitored individuals acting as relays.

Referring now to FIG. 17, similar to the discussion of FIGS. 6 and 7, unnoticed by the location data in FIG. 6 is an unmonitored individual C shown by pathway 706 (shown in dashed lines) and an unmonitored individual D shown by pathway 1710 (shown in dotted-dashed lines). Unmonitored individual C met monitored individual A between 9 AM and LOAM. Unmonitored individual C and unmonitored individual D later meet at location 1712, although the specific location and time are not likely known due to the unmonitored status. Unmonitored individual D then later meets monitored individual B between 12 PM and 1 PM. These three meetings provided an opportunity for unmonitored individuals C and D to relay items, information or communications from monitored individual A to monitored individual B. That relay is not discernable in FIG. 17 by monitoring of the location information alone, and indeed would likely not be discernable per prior discussed embodiments because no such wireless overlap exists between any three individuals.

The system can nonetheless identify a potential overlap by identifying a relationship between unmonitored individuals C and D that is indicative of collective action. By way of non-limiting example, as noted above the system would detect the presence of the wireless access points of unmonitored persons C and D. These detected wireless access points could then be cross referenced to see whether they and/or their owners had any relationship, such as both wireless access points were owned by known members of the same gang or crime family.

Figure 18:
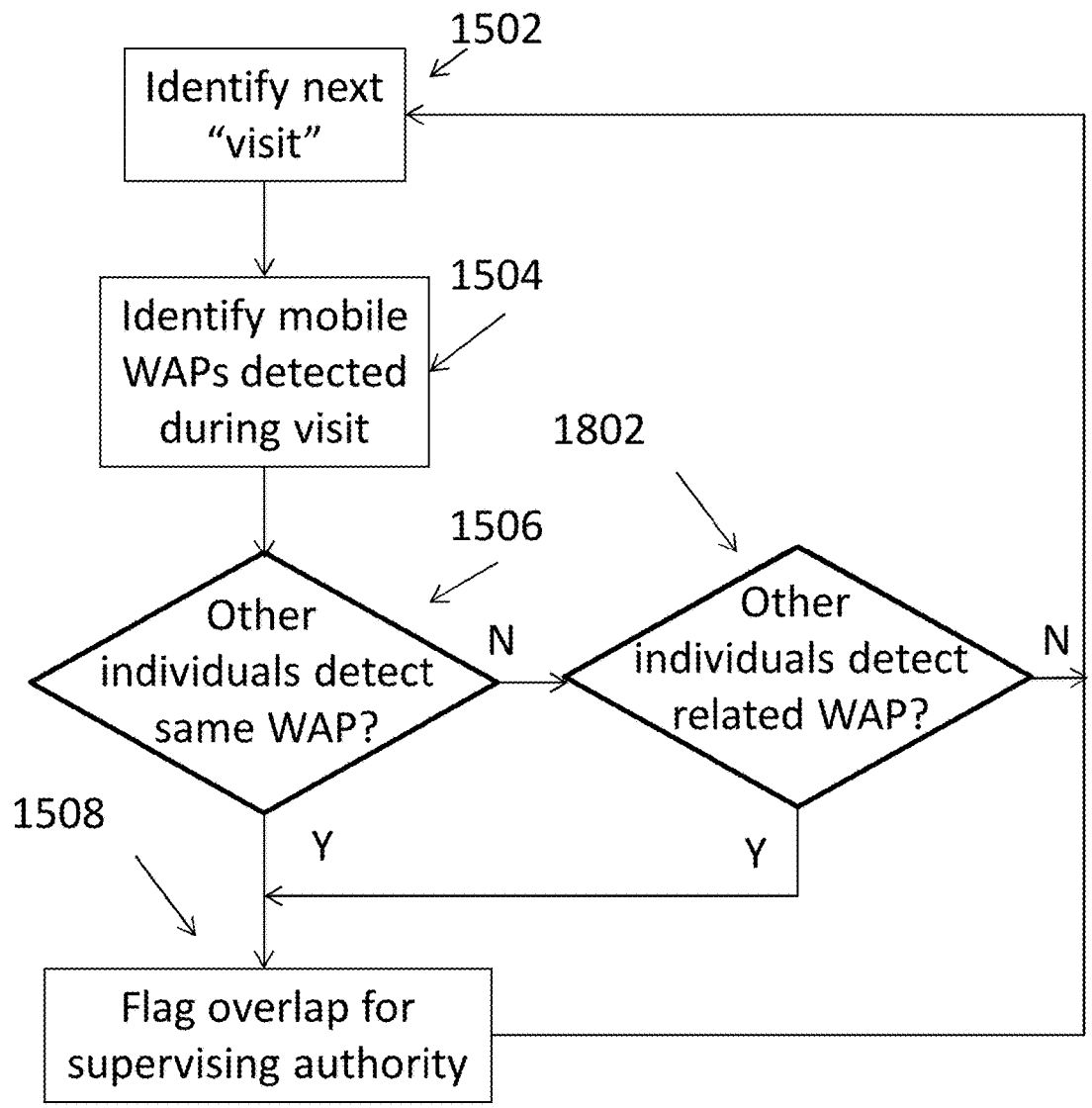

FIG. 18 shows non-limiting example of a flowchart for implementing the above embodiments. The steps in FIG. 18 are the same as FIG. 15, save that in response to no commonly detected wireless access point at step 1506, at step 1802 the system determines whether any other monitored individuals have encountered a related wireless access point. For example, if the detected wireless access point is known to be owned by a member of a gang, then step 1802 identifies any other monitored individuals that encountered a wireless access point from a member of that same gang. Such data may already be resident in the system (per step 1304 above), or may be obtained at a different time/step.

Variations of the above embodiments include consideration of other data that is not itself related to the monitoring system but which may contribute to filtering out or highlighting certain types of encounters, or even identifying other suspicious activity. By way of non-limiting example, it is known that monitoring systems can store specific areas of interest (e.g., bars, schools) and determine if the monitored individual was present in those areas. In the embodiments herein, from detection of the wireless access points of unmonitored persons C and/or D the monitoring system may identify (from other databases) known locations frequented by unmonitored individuals C and D and add those locations to the specific areas of interest to see if the monitored individual was present there. By way of another non-limiting example, the movement of the monitored individuals could be cross referenced with movement data of unmonitored individuals obtained by different monitoring methods, e.g., warrant based data collected from wireless carriers or tracking devices placed on target's vehicles, etc.

Figure 16:
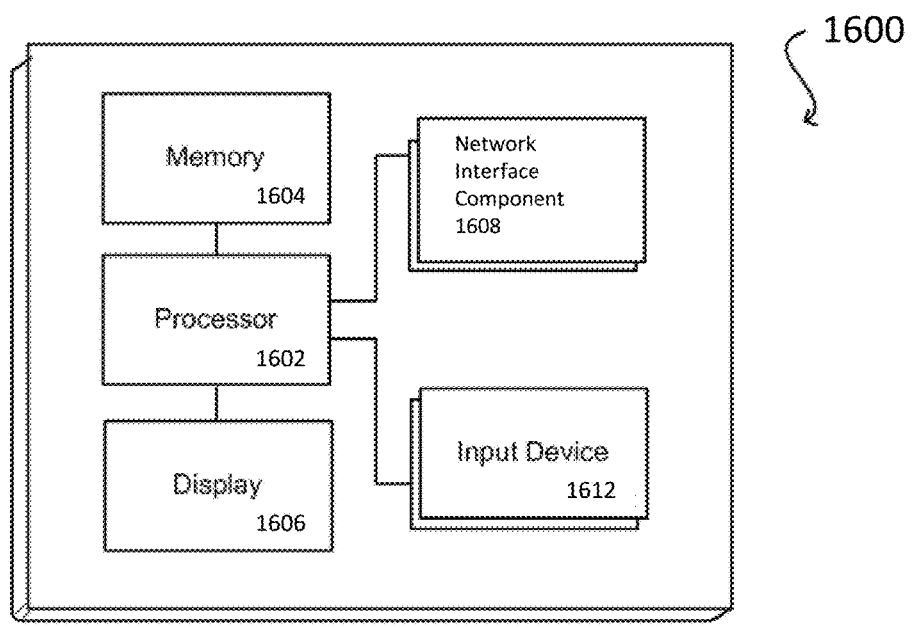
FIG. 16 illustrates a logical arrangement of a set of general components of an example computing device that can be utilized in accordance with various embodiments.

FIG. 16 illustrates a logical arrangement of a set of general components of an example computing device 1600 as could be used for the computer elements of monitoring device 12 and/or central monitoring location 35. In this example, the device includes a processor 1602 for executing instructions that can be stored in a memory device or element 1604. As would be apparent to one of ordinary skill in the art, the device can include many types of memory, data storage, or non-transitory computer-readable storage media, such as a first data storage for program instructions for execution by the processor 1602, a separate storage for images or data, a removable memory for sharing information with other devices, etc. The device typically will include some type of display element 1606, such as a touch screen or liquid crystal display (LCD), although devices such as portable media players might convey information via other means, such as through audio speakers. As discussed, the device in many embodiments will include at least one input element 1608 able to receive conventional input from a user. This conventional input can include, for example, a push button, touch pad, touch screen, keyboard, mouse, keypad, or any other such device or element whereby a user can input a command to the device. In some embodiments, the computing device 1600 of FIG. 16 can include one or more network interface elements 1608 for communicating over various networks, such as a Wi-Fi, Bluetooth, RF, wired, or wireless communication systems. The device in many embodiments can communicate with a network, such as the Internet, and may be able to communicate with other such devices.

Each computing device typically will include an operating system that provides executable program instructions for the general administration and operation of that device and typically will include computer-readable medium storing instructions that, when executed by a processor of the server, allow the computing device to perform its intended functions. Suitable implementations for the operating system and general functionality of the servers are known or commercially available and are readily implemented by individuals having ordinary skill in the art, particularly in light of the disclosure herein.

Various embodiments discussed or suggested herein can be implemented in a wide variety of operating environments, which in some cases can include one or more user computers, computing devices, or processing devices which can be used to operate any of a number of applications. User or client devices can include any of a number of general purpose individual computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, an individual of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system adapted to track detecting interaction between monitored individuals and unmonitored individuals, the system comprising:

a plurality of personal monitoring devices, each personal monitoring device being adapted to (a) be attached to a monitored individual within a monitored population and (b) identify a wireless device with short range wireless capability that is proximate to the personal monitoring device, each of the personal monitoring devices comprising;

location circuitry adapted to determine a location of the personal monitoring device;

a modem adapted to upload, from the personal monitoring device to a central monitoring location, data corresponding to the identified wireless device and the location of the personal monitoring device when the wireless device was detected;

a central monitoring location, comprising a combination of electronic computer hardware and software programmed to:

determine whether:

(a) the identified wireless device is mobile; and (b) at least two of the personal monitoring devices encountered the identified wireless device; and notify, in response to at least a positive outcome of the determine, a supervising authority that conditions are present indicating that monitored individuals assigned to at least some of the at least two of the personal monitoring devices are in indirect communication.

2. The system of claim 1, wherein (a) of the determine comprises consulting a database of previously detected wireless devices for indication that the wireless device was previously classified as mobile.

3. The system of claim 1, wherein (a) of the determine comprises classifying the wireless device as mobile in response to uploaded data from at least one of the personal monitoring devices indicating that the at least one of the monitored individuals were at significantly different locations when the wireless device was detected.

4. The system of claim 1, wherein the identify comprises detect wireless devices that satisfy predetermined criteria.

5. The system of claim 4, wherein the predetermined criteria includes a signal strength above a threshold, the threshold being consistent with proximity of less than about 10 feet.

6. The system of claim 1, wherein (b) of the determine comprises disregarding stationary wireless devices.

7. The system of claim 1, wherein (b) of the determine comprises determining whether at least two of the personal monitoring devices encountered the identified wireless device within ranges of less than about 10 feet.

8. The system of claim 1, further comprising the central monitoring location being programmed to invalidate, in response to at least (a) of the determine, reliance on the wireless device for layered location purposes.

9. The system of claim 1, wherein the determine further comprises, in response to the identified wireless device being authorized: (a) disregarding a result of the determine in response to the identified wireless device being authorized, or (b) excluding the identified wireless device from the determine.

10. The system of claim 1, wherein indirect communication is defined at least in part by at least two of the personal monitoring devices having common contact at substantially different locations with an unmonitored individual carrying the wireless device.

11. A method for detecting interaction between monitored individuals assigned to personal monitoring devices and unmonitored individuals, comprising:
at each personal monitoring device:
identifying a wireless device that is proximate to the personal monitoring device;
first determining a location of the personal monitoring device;
uploading, personal monitoring device to a central monitoring location, data corresponding to the identified wireless device and the location of the personal monitoring device when the wireless device was detected;
at the central monitoring location:
second determining whether:
(a) the identified wireless device is mobile; and
(b) at least two of the personal monitoring devices encountered the identified wireless device; and
notify, in response to at least a positive outcome of the second determining, a supervising authority that conditions are present indicating that monitored individuals assigned to at least some of the at least two of the personal monitoring devices are in indirect communication.

12. The method of claim 11, wherein (a) of the second determining comprises consulting a database of previously detected wireless devices for indication that the wireless device was previously classified as mobile.

13. The method of claim 11, wherein (a) of the second determining comprises classifying the wireless device as mobile in response to uploaded data from at least one of the personal monitoring devices indicating that the at least one of the monitored individuals were at significantly different locations when the wireless device was detected.

14. The method of claim 11, wherein the identifying comprises detecting wireless devices that satisfy predetermined criteria.

15. The method of claim 14, wherein the predetermined criteria includes a signal strength above a threshold, the threshold being consistent with proximity of less than about 10 feet.

16. The method of claim 11, wherein (b) of the second determining comprises disregarding stationary wireless devices.

17. The method of claim 11, wherein (b) of the second determining comprises determining whether at least two of the personal monitoring devices encountered the identified wireless device within ranges of less than about 10 feet.

18. The method of claim 11, further comprising invalidating, in response to at least (a) of the second determining, reliance on the wireless device for layered location purposes.

19. The method of claim 11, wherein the second determining further comprises, in response to the identified wireless device being authorized: (a) disregarding a result of the second determining in response to the identified wireless device being authorized, or (b) excluding the identified wireless device from the second determining.

20. The method of claim 11, wherein indirect communication is defined at least in part by at least two of the personal monitoring devices having common contact at substantially different locations with an unmonitored individual carrying the wireless device.

21. A system adapted to track detecting interaction between monitored individuals and unmonitored individuals, the system comprising:
a plurality of personal monitoring devices, each personal monitoring device being adapted to (a) be attached to a monitored individual within a monitored population and (b) upload data to a central monitoring location;
a central monitoring location, comprising a combination of electronic computer hardware and software programmed to:
determine, from data uploaded by the personal monitoring devices, if at least two of the personal monitoring devices encountered a mobile wireless device at different times and at different locations; and
notify, in response to at least a positive outcome of the determine, a supervising authority that conditions are present indicating that monitored individuals assigned to at least some of at least two of the personal monitoring devices are in indirect communication.

22. A system adapted to track detecting interaction between monitored individuals and unmonitored individuals, the system comprising:
at each of a plurality of personal monitoring devices, uploading data to a central monitoring location;
at a central monitoring location:
determining, from data uploaded by the personal moni-
toring devices, if at least two of the personal monitoring devices encountered a mobile wireless device at different times and at different locations; and notify, in response to at least a positive outcome of the determine, a supervising authority that conditions are present indicating that monitored individuals assigned to at least some of at least two of the personal monitoring devices are in indirect communication.

* * * * *